B. L. WEAVER.
MACHINE FOR CASTING STEPPED SPLICE BARS.
APPLICATION FILED APR. 4, 1918.

1,281,237.

Patented Oct. 8, 1918.
2 SHEETS—SHEET 1.

Inventor
Bent L. Weaver
by
Attorney

B. L. WEAVER.
MACHINE FOR CASTING STEPPED SPLICE BARS.
APPLICATION FILED APR. 4, 1918.

1,281,237.

Patented Oct. 8, 1918.
2 SHEETS—SHEET 2.

Inventor
Bent L Weaver
by A. V. Groupy
Attorney

UNITED STATES PATENT OFFICE.

BENT L. WEAVER, OF HARRISBURG, PENNSYLVANIA.

MACHINE FOR CASTING STEPPED SPLICE-BARS.

1,281,237.  Specification of Letters Patent.  Patented Oct. 8, 1918.

Application filed April 4, 1918. Serial No. 226,605.

*To all whom it may concern:*

Be it known that I, BENT L. WEAVER, a citizen of the United States, residing at Harrisburg, in the county of Dauphin and State of Pennsylvania, have invented certain new and useful Improvements in Machines for Casting Stepped Splice-Bars, of which the following is a specification.

Heretofore in casting stepped splice bars for rail joints for joining the meeting ends of railroad rails of different sizes it has been necessary to make a complete pattern for each instance in which it was desired to make a splice bar to form a joint for a rail of any particular size joined to a rail of another size and thereafter to form the mold for the desired splice bar from the complete pattern. This has been objectionable because it has necessitated the making of a large number of patterns, owing to the large number of combinations of rails of different sizes, resulting in great expense, loss of time and other inconveniences.

The object of my invention is to overcome the objection above mentioned; and I accomplish my object by providing a mold forming machine having mold forming members comprising separable sections which may be removed for the substitution of others in forming molds for different splice bars, and which are preferably constructed to form a mold for a splice bar in which the end of the mold which is to form the end of the bar which is to fit a rail of one size is formed of sections of the members which are separable from sections of the members which are to form a mold for the other end of the bar which is to fit a rail of another size, so that the sections which form the mold for one end of the bar may be removed and other sections substituted for them where it is desired to change the character of one end of the mold formed by the members to cast a splice bar for a different combination of rails.

With this object in view my invention consists in the novel construction and combinations of parts hereinafter described and claimed.

In the accompanying drawings, illustrating my invention,

Figure 1:
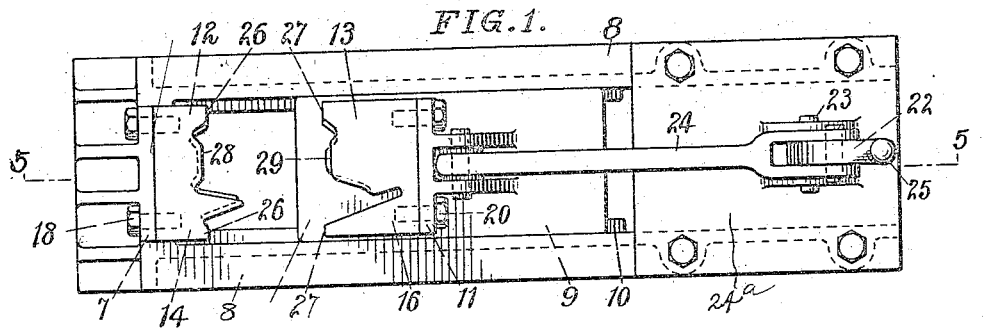
Figure 1 is a plan of my improved mold forming machine in the open position.
Figure 2:
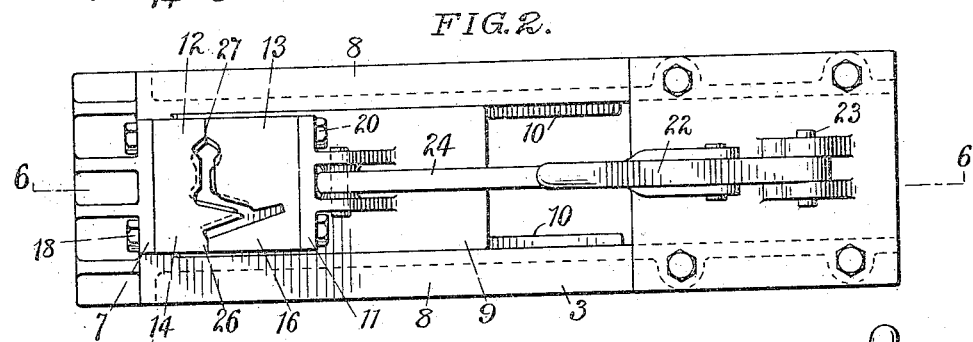
Fig. 2 is a similar view in the closed position.
Figure 3:
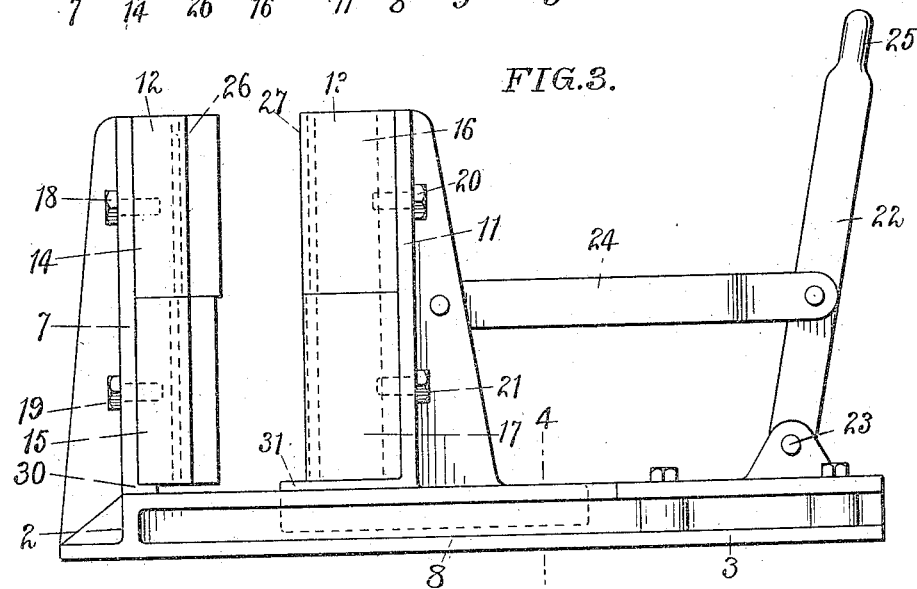
Fig. 3 is a side elevation of the machine in the open position.
Figure 4:
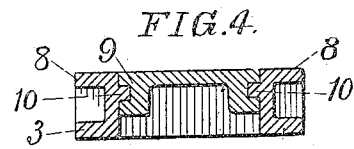
Fig. 4 is a sectional detail of the machine frame and carriage, on line 4—4 of Fig. 3.
Figure 5:
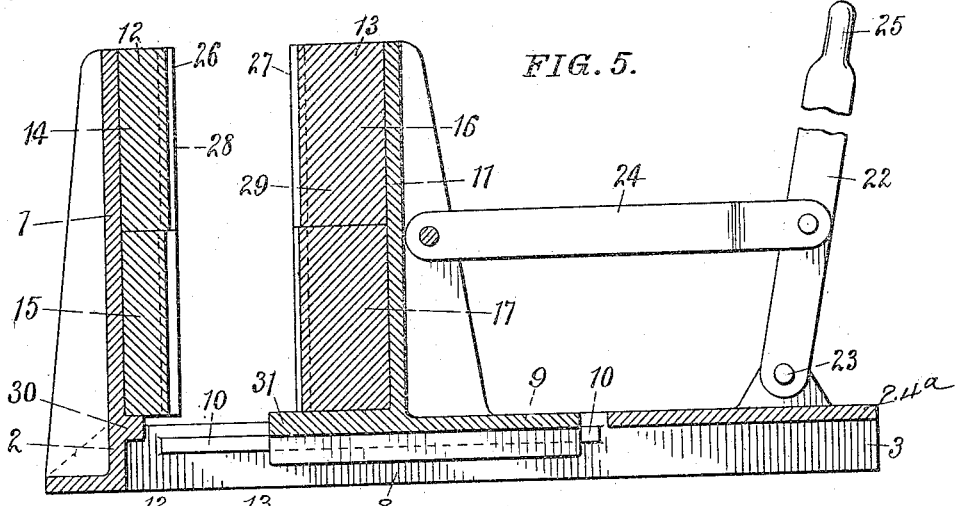
Figure 6:
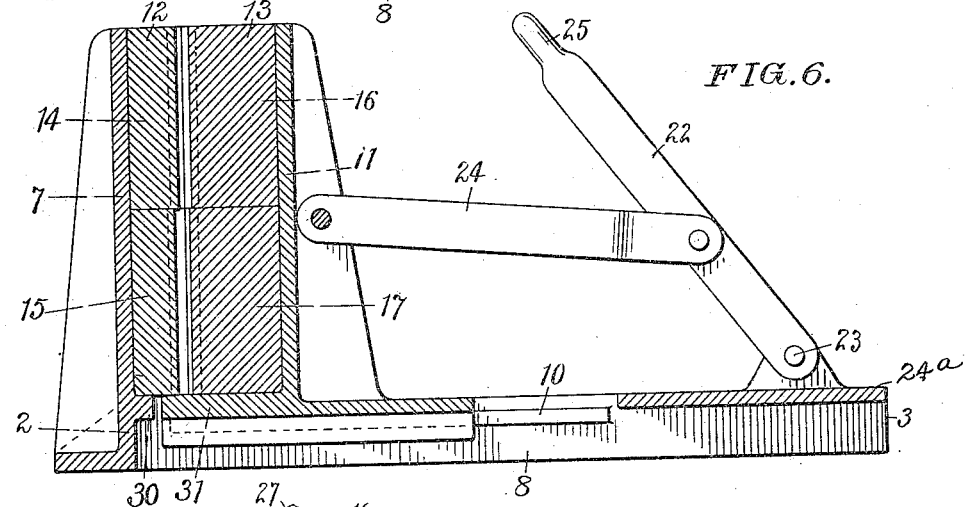

Figs. 5 and 6 are longitudinal sections of the machine on lines 5—5 and 6—6 of Figs. 1 and 2, respectively.

Figure 7:
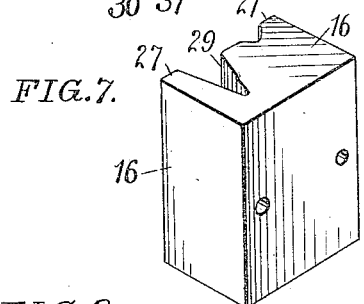

Fig. 7 is a perspective view of one of the sections of one of the mold forming members detached from the machine.

Figure 8:
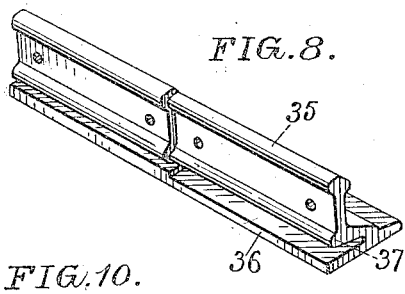

Fig. 8 is a perspective view of a finished, stepped splice bar.

Figure 9:
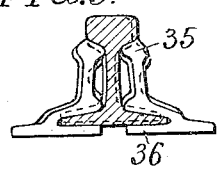

Fig. 9 is a transverse section of a rail joint including two stepped splice bars.

Figure 10:
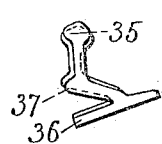

Fig. 10 is a view of a stepped splice bar as it comes from the machine, before the base portion is bent into final position.

Referring to the drawings, 2 designates the frame of the machine and it comprises a bed portion 3 and a standard 7 rising from one end thereof.

The bed portion 3 includes parallel side members 8 between which is arranged a horizontally movable carriage 9 which is fitted to slide on horizontal ribs 10 which project inwardly from the side members 8.

The carriage 9 is provided with a standard 11 which rises therefrom opposite to the standard 7 on the frame 2.

The standards 7 and 11 are adapted to support two vertically disposed mold forming members 12 and 13, respectively. The member 12 comprises two separable sections 14 and 15 which are arranged adjacent to each other and preferably end to end and one above the other; and the other member 13 comprises two separable sections 16 and 17 which are arranged adjacent to each other and preferably end to end and one above the other. The sections 14 and 15 of the member 12 are separately and detachably secured to the standard 7 by means of removable screws 18 and 19, respectively; and the sections 16 and 17 of the member 13 are separately and detachably secured to the standard 11 by means of removable screws 20 and 21, respectively.

The carriage 9 is adapted to be moved toward and from the frame standard 7 to move the mold forming member 13 into and from operative relation to the mold forming member 12; and, for this purpose I provide a hand lever 22 which is fulcrumed, at 23, at its lower end to lugs formed on a plate 24ª which is secured to the bed portion of the frame 2 and which is connected by a link or bar 24 to the standard 11 of the carriage 9, as clearly shown in the drawings. The upper end of the lever 22 is provided with a suitable handle 25 by means of which the carriage 9 and therewith the member 13 may be moved.

The respective sides of the mold forming members 12 and 13 are provided with opposing, vertically-extending faces 26 and 27, respectively, which are adapted to abut against each other when the member 13 is moved into operative relation to the member 12, as shown in Figs. 2 and 6; and the members 12 and 13 are provided with vertically-extending mold forming faces 28 and 29 which extend between the respective faces 26 and 27 of the members 12 and 13 and which will be presently described.

The mold forming members 12 and 13 are adapted to rest upon ledges or floor portions 30 and 31 which project horizontally from the standards 7 and 11, respectively, as clearly shown in Figs. 5 and 6. The floor portion 30 of the standard 7 does not extend to the mold forming face 28 of the member 12, and the floor portion 31 of the standard 11 extends to and beyond the mold forming face 29 of the member 13 and is adapted to pass beneath and beyond the mold forming face of the member 12 when the carriage 9 is moved to move the member 13 into operative relation to the member 12, as shown in Fig. 6; whereby, when the parts are in the operative position shown in Fig. 6, the floor portion 31 will close the bottom of the mold formed between the faces 28 and 29 and form a means to prevent molten metal from flowing from between the vertical mold forming walls 28 and 29 of the members 12 and 13; and whereby the casting formed by the members 12 and 13 may be dropped down between the standards 7 and 11 and between the side members 8 of the machine frame when the parts are moved to the position shown in Figs. 1 and 5.

Stepped splice bars are formed so that the respective end portions of the bar from the center thereof outwardly will properly fit the respective ends of the two rails of different sizes to be joined by the bar, as is well known to persons skilled in this art. Therefore, I construct the mold forming faces 28 and 29 of the sections 14 and 16 of the members 12 and 13 to form one end of a bar which is adapted to fit against a rail of one size, and I construct the mold forming faces 28 and 29 of the sections 15 and 17 of the members 12 and 13 to form the other end of the same bar adapted to fit against a rail of another size, so that when the member 13 is moved into operative relation to the member 12 the two complete members will form a mold for a stepped splice bar which will properly fit against two rail sections of predetermined different sizes.

When it is desired to change the character of either end of the mold in conformity with a rail of a different size, the sections 14 and 16 or the sections 15 and 17 may be removed from the standards 7 and 11, and other sections, constructed to form a bar with the desired change, substituted therefor. It will thus be understood that if sections 14 and 16 and sections 15 and 17 of the members 12 and 13 are provided to form the ends of splice bars for a number of rails of different sizes, any desired combination of the sections may be assembled upon the standards 7 and 11 to form a mold for a stepped bar to fit any particular combination of rail sections of different sizes, thereby avoiding the necessity of making a single pattern for the formation of a mold for each bar which is to fit each different combination of rail sections.

The sections 14 and 15 have their mold forming faces extending parallel to a straight line or parallel to the sides of the rails against which the splice bar is formed to fit, and the said parallel faces of the section 14 are out of alinement with the said parallel faces of the section 15 to properly fit against two rail sections of different sizes; and, similarly, the sections 16 and 17 have some or all of their mold forming faces extending parallel to said line and out of alinement with each other, as the character of the splice bar may dictate, to form the bar with the proper thicknesses of metal in the different parts thereof, all as will be readily understood by persons skilled in this art.

The particular form of splice bar 35 illustrated in Figs. 8 and 9 is provided with a base portion 36 adapted to extend beneath and to support the ends of the rail sections at the joints thereof, and the sections 14, 15, 16 and 17 of the mold forming members 12 and 13 are constructed to form a splice bar which when finished will conform to the splice bar shown in Figs. 8 and 9. This type of splice bar, when it leaves the mold, is in the form illustrated in Fig. 10; that is to say the base portion 36 is spaced a greater distance from the rail-engaging portion 37 of the bar than in the finished article; and, thereafter, while the metal is yet sufficiently hot to permit it to be bent without injury thereto, the base portion 36 is bent from the condition shown in Fig. 10 to its final form as shown in Figs. 8 and 9.

It will of course be understood that the sections 14, 15, 16 and 17 may be constructed to form stepped splice bars of many different types.

I claim:—

1. In a mold forming machine for casting stepped splice bars, a plurality of mold forming members, each member comprising two separable sections arranged adjacent to each other, each section having mold forming faces parallel to a straight line, the said faces of one section of each member being out of alinement with the said faces of the other section thereof, means to detachably hold said sections together in a mold forming position, and means to prevent molten metal from flowing from within the mold formed by said sections.

2. In a mold forming machine for casting stepped splice bars, a plurality of mold forming members, each member comprising two separable sections arranged adjacent to each other, each section having mold forming faces parallel to a straight line, the said faces of one section of each member being out of alinement with the said faces of the other section thereof, the sections of one of said members having other mold forming faces parallel to said line and in alinement with each other, means to detachably hold said sections together in a mold forming position, and means to prevent molten metal from flowing from within the mold formed by said sections.

3. In a mold forming machine for casting stepped splice bars, the combination of a supporting frame, a vertically disposed mold forming member comprising two separable sections arranged end to end and one above the other, means to detachably secure each of said sections to said frame, a carriage movable on said frame toward and from said member, a second vertically disposed mold forming member comprising two separable sections arranged end to end and one above the other, means to detachably secure each section of said second member to said carriage, means operative to move said carriage toward and from the first named member to move the second named member into and from operative relation to the first named member, each of said sections having mold forming faces of different contours which form a mold when said second member is moved into operative relation to the first named member, and a wall closing the bottom of said mold.

BENT L. WEAVER.

Copies of this patent may be obtained for five cents each, by addressing the "Commissioner of Patents, Washington, D. C."